Feb. 14, 1967   M. HRABOWECKYJ   3,304,004
VEHICLE HEATING METHOD AND APPARATUS
Filed May 24, 1965
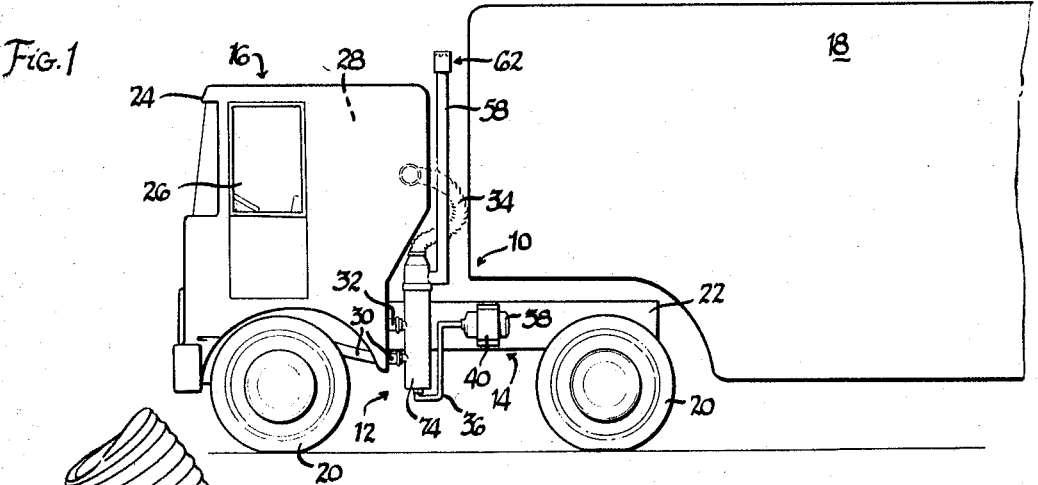
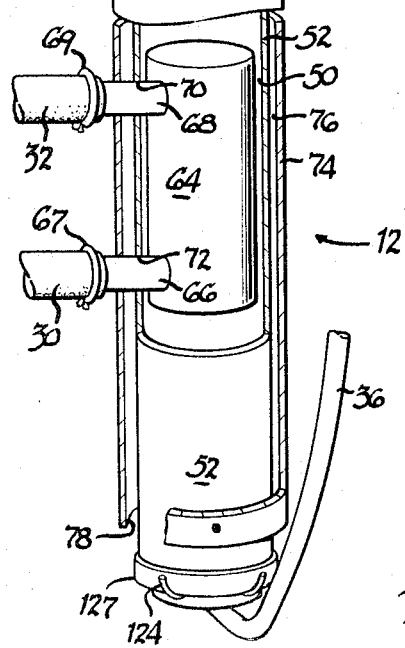
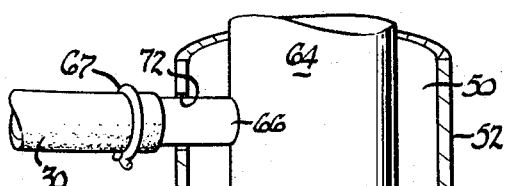
Inventor.
MYKOLA HRABOWECKYJ
By Wilson, Settle, Batchelder & Craig
Att'ys.

United States Patent Office 3,304,004
Patented Feb. 14, 1967

3,304,004
VEHICLE HEATING METHOD AND APPARATUS
Mykola Hraboweckyj, 9037 Danzig,
Livonia, Mich. 48150
Filed May 24, 1965, Ser. No. 457,927
5 Claims. (Cl. 237—12.3)

The present invention relates generally to a novel system for jointly preheating the engine of a vehicle and the interior of the vehicle during cold weather and more particularly to such a system, including method and apparatus, which system is completely safe to occupants of the vehicle, though a hydrocarbon is used as the combustible fuel, and which may be operated for prolonged periods of time, without reliance upon electrical and mechanically operated parts, the engine coolant being used to heat the vehicle engine and air being used to heat the vehicle interior.

It has been proposed in the past that a gas heater be used during cold weather to preheat the engine of a vehicle, usually of the automotive type, by elevating the temperature of the engine liquid coolant. (Examples of such heaters appear in United States Patents 2,627,258, 2,681,052 and 2,737,169.) Such developments were reasonably satisfactory within their capabilities, though they exhibited several objectionable features, such as high cost due to mechanically moving parts, e.g. special valves, controls, thermostats and the like, and the lack of safety precautions, e.g. deadly peril of poisonous carbon monoxide gas infiltrating into the vehicle interior following discharge of the exhaust to the atmosphere beneath the hood adjacent the vehicle engine.

Prior proposals have also included the suggestion that a gas heater be used to elevate the temperature of the engine coolant, which coolant is then in turn circulated through both the engine block to heat the engine and the interior of the vehicle to elevate the temperature therein through use of the battery-driven fan (see United States Patent 3,131,864). Such proposals have not achieved commercial acceptance principally likely due to (1) the danger of lethal carbon monoxide infiltration into the vehicle interior following discharge from the heater under the hood, (2) the ease with which the flame is extinguished by the wind, (3) the heater's incapability of being used over a prolonged period of time due to significant battery discharge by the electrically driven parts, such as the fan, the coolant pump, etc. (4) engine coolant heating of the vehicle is often inadequate to bring the temperature of the vehicle interior to a comfortable level during periods of extreme cold weather, and (5) installation and maintenance of the gas heater beneath the hood of the vehicle immediately to one side of the engine are both cumbersome and costly.

In view of the foregoing, it is a primary object of this invention to overcome the above-recited deficiencies of the prior art by providing a novel method of and apparatus for heating both the inactive engine of a vehicle to operating temperature and the interior of the vehicle to a comfortable level.

Another important object of this invention is the provision of a novel system, including method of and apparatus, for jointly heating the engine and the interior of the vehicle, which system is completely safe to the occupants of the vehicle, posing no carbon monoxide threat, and which requires no electrical or mechanically moving parts.

A further significant object of this invention is the provision of a novel system, including method and apparatus, for simultaneously heating the engine of the vehicle and the interior of the vehicle, the engine coolant being utilized to elevate the temperature of the engine and air freely drafted from the atmosphere being utilized to elevate the temperature of the vehicle interior.

Another and no less important object of the present invention is to provide a novel system including method and apparatus, for jointly heating the engine and the interior of the vehicle, the system having one or more of the following features: (1) may be used for an indefinite period of time without adverse effects; (2) utilizes naturally drafted air for combustion and for heating the vehicle interior; (3) segregates the exhaust from the air used to heat the vehicle interior; (4) is of simplified relatively inexpensive construction; (5) may be mounted at the exposed exterior of the vehicle to simplify and reduce the cost of installation and maintenance; (6) expels the products of combustion, including carbon monoxide, above the level of the vehicle interior; (7) prevents extinguishment of the flame due to wind during combustion; (8) prevents back draft and precipitation from entering into the interior of the heater; and (9) the burner of which is selectively removable from the remainder of the heater apparatus for easily initiating combustion and for use, independent of the heater, for example as a blow torch.

These and other objects and features of the present invention will become more fully apparent from the following description and appended claims in conjunction with the accompanying drawings, wherein:

FIGURE 1 is a schematic elevation of a diesel tractor-trailer combination equipped with the novel heating apparatus of the present invention;

FIGURE 2 is an enlarged side elevation in perspective, with parts broken away for clarity of illustration, of the dual purpose heating apparatus of FIGURE 1;

FIGURE 3 is an enlarged fragmentary elevation in perspective, with parts broken away for clarity of illustration, of the burner portion of the dual purpose heating apparatus of FIGURES 1 and 2; and FIGURE 4 is an enlarged fragmentary perspective, with parts broken away for clarity of the exhaust cap of the apparatus of FIGURE 1.

While the present invention has utility with respect to all vehicles having an engine and an interior, it is especially suitable for use in conjunction with diesel tractor and trailer combinations, the diesel engine of which normally encounters significant difficulty in starting in cold weather. Thus, when the driver of the diesel transport parks his vehicle and retires for a period of several hours, either to the sleeper cab of the diesel tractor or to rooming accommodations elsewhere, the diesel engine as well as the cab interior (in the absence of an auxiliary heater) becomes significantly chilled. When the driver has completed his rest and is again ready to resume travel, the temperature of the diesel engine will have been lowered to level making it extremely difficult to start. Often a prolonged period of time and an extremely strong battery are required in order to start the diesel engine. Sometimes it is even necessary to "tow" the tractor-trailer combination by another vehicle for a short distance in order to start the engine.

Thus, starting the diesel engine in cold weather is extremely cumbersome and often costly as well as time consuming. Furthermore, the operator, if he chooses to sleep in the sleeper cab is likely to become uncomfortable due to the descending temperatures therein following shut-off of the engine unless an auxiliary heater, usually drawing electrical potential from the engine battery, is utilized. After starting, an additional period of time necessarily must elapse before the diesel engine reaches operating temperature and the interior of the cab can be heated, in the normal manner, to a comfortable temperature.

The present development provides a system which utilizes a heater, preferably of the butane type, to supply hot air to the cab interior and to elevate the temperature of the water coolant for as long a period as desired without adverse effects upon the vehicle components or upon occupants of the vehicle. Thus, the temperature of the engine and the cab interior may be maintained at operating levels following shut-off of the engine, if desired, or alternatively, following shut-down for an extended period of time, the dual-purpose heater may be used to elevate the temperature of the engine and the cab interior to desired levels within a relatively brief period of time. No mechanically moving or electrical parts are used.

Thus, when the operator is prepared to resume his travel, the diesel engine will quickly start without delay and the cab will be at a comfortable temperature.

Reference is now made to the drawings, wherein like numerals are used to designate like parts throughout. As depicted in FIGURE 1, the present invention embodies a heating apparatus, generally designated 10, and comprising a heater, generally designated 12 and a heater fuel supply system, generally designated 14. The heating apparatus 10 is mounted to the frame of a tractor 16, which frame accommodates attachment of a trailer 18. The tractor 16 and trailer 18 are conventional, with the tractor including tires 20, a frame 22, and a cab 24, including a driver's space 26 and sleeper cab 28. The trailer 18 is secured to and drawn by the tractor 16 is a conventional manner which need not be described here.

The heater apparatus 10 may be mounted upon the exposed exterior of the tractor at the frame 22 by brackets, bolts or any other suitable fastening arrangement (not shown). The heater 12 communicates with the diesel engine cooling system concealed by the tractor 16 through a pair of hoses 30 and 32 to accommodate flow of the engine coolant, usually water or antifreeze, from the engine block through the heater 12 and back to the engine block, the water being circulated by reason of temperature differential caused by the heat exchange within the heater 12.

The heater 12 also communicates with the sleeper cab 28 through a flexible hose or conduit 34 accommodating flow of hot air drawn from the atmosphere through the heater 12 into the conduit 34 and thereafter into the sleeper cab 28 by convectional currents. Naturally, provision may be made for delivering the hot air from the conduit 34 into the operator's space 26 or into both the operator space 26 and the sleeper cab 28, if desired. The heater 12 is thus advantageous since it costs significantly less to operate per unit of time than is required to operate the tractor engine per se and, furthermore, does not create annoying vibrations and is comparatively quiet, thus, making it easier for the operator to rest in the sleeper cab 28.

A line 36 provides for passage of butane or like hydrocarbon from the tank 38 of the fuel supply apparatus 14 to the heater 12, the tank 38 being held in fixed position adjacent the frame 22 by a bolt secured bracket 40. The supply line 36 is normally equipped with a selectively settable valve (not shown) for controlling the quantity of hydrocarbon fuel issuing therefrom into the burner 12.

FIGURE 2 depicts the heater 12 somewhat enlarged and in greater detail with parts broken away for purposes of clarity. As can be seen from inspection of FIGURE 2, the general shape of the heater 12 is cylindrical. This allows for ready induction of natural air drafts, eliminates the need for electrical or mechanical devices to circulate the air and the engine coolant and allows for simplified installation and maintenance of the heater on the truck.

The heater 12 includes a generally cylindrical combustion chamber 50 enclosed by a metal sleeve 52. The sleeve 52 is open at the bottom 54 (see FIGURE 3) to accommodate natural air draft from the atmosphere into the heater. The sleeve 52 is enclosed at the top 56 to segregate the exhaust fumes and accommodate their exit from the heater 12 through an L-shaped exhaust chimney 58 communicating exhaust from the chamber 50 through a port 60 in the sleeve 52 and out to the atmosphere through an exhaust cap 62 (see FIGURES 1 and 4).

The exhaust cap 62, as seen in FIGURE 4, is closed at the top by an integral plate 63, is supported by spaced struts 65 which are integral with both the chimney 58 and the casing 67 of the cap 62, and is provided with an annular opening 69 and with apertures 71 along the sides. Thus, by reason of the described construction, the exhaust cap 62 prevents back-draft into the heater 12 without the need moving shutters and also prohibits entrance of the precipitation into the heater. Hence, the exhaust fumes, formed as products of combustion within the heater 12, are exhausted from the combustion chamber 50 within the sleeve 52 through the exhaust chimney 58 and out the exhaust cap 62 which is situated at the level above the vehicle cap thereby obviating any possibility of danger to the occupants of the tractor due to inhalation of carbon monoxide. The combustion chamber 50 does not communicate exhaust to any other part of the heater 12.

As seen by continued reference to FIGURE 2, the combustion chamber contains an engine coolant boiler or reservoir 64, which takes the shape of a cylinder closed at both ends and provided with a pair of ports, i.e. an inlet port 66 and an outlet port 68. The cylindrical boiler 64 is disposed at or below the water level of the engine for natural, heat-induced circulation. In this way, the normal heating action of the engine coolant within the boiler 64 causes the coolant to rise and circulate through the engine block with engine coolant influent passing through the hose 30 at inlet port 66 into the boiler 64 and out from the boiler 64 through the outlet port 68 and the hose 32 whereupon the coolant is returned to the engine. Clamps 67 and 69 secure the hoses 30 and 32 to the ports 66 and 68, respectively. The thermostats of the vehicle engine prevent the boiler 64 from overheating and, therefore, provision of special thermostats is not necessary. Note that the boiler 64 is spaced within the combustion chamber 50 away from the interior walls of the sleeve 52 to accommodate ready heating of the boiler contents and to allow for ready passage of exhaust to the chimney 58. The stub ports 66 and 68 are preferably welded at apertures 70 and 72 in the sleeve 52 to prohibit egress of exhaust therethrough and to securely support the boiler in its illustrated position.

Concentrically disposed about the exterior surface of the shell 52 is an outer sleeve 74, the space between the sleeve 74 and the sleeve 52 constituting an air heating chamber 76. The base of the sleeve 74 is open providing an annular entrance 78 facilitating ready natural air draft into the chamber 76. The sleeve 74 is circumscribed at the top by a connecting band 80, immediately beneath the L-shaped chimney 52 at port 60. The band 80 may be integral with the sleeve 74 as by welding and engagement with the chimney at 82 supports both the weight of the interior sleeve 52 and the exhaust chimney 58.

A removable reducer portion 86 fits snugly within the upper portion of the band 80 and may be readily lifted from such engagement. A slotted aperture 88 is provided to fit over the chimney 58 immediately adjacent the port 60. This facilitates easy maintenance and disassembly of the heater, the reducer 86 being retained in the position depicted in FIGURE 2 during operation by reason of gravity and a tight frictional engagement with the band 80. reducer 86 is attached to the flexible conduit 34 by means of a clamp 90, of conventional type. Thus, air flow is accommodated up through annular opening 78 of the air heating chamber, up through the chamber and the reducer 86 as well as the flexible conduit 34 and into the sleeper cab 28, all by convectional currents.

The burner assembly, generally designated 100 is depicted in enlarged side elevation with parts broken away for clarity in FIGURE 3. The burner assembly 100 includes a pressure jet nozzle 102 supplied with hydrocarbon fuel through the line 36 from the tank 38 (FIGURE 1). The nozzle 102 is mounted upon a base plate 104 which in turn is integrally secured by any suitable means to a burner protector 106 of general cylindrical form. A plurality of spaced apertures 108 provide for introduction of air by natural draft into the combustion chamber 50 at the base of the burner transversely adjacent and immediately below the nozzle 102 (so that air is drawn upward into the flame instead of directly into it). A plurality of apertures 110 near the top of the cylindrical burner protector 106 facilitate introduction of air by natural draft into the combustion chamber at an elevation above the nozzle 102. The primary purposes of the burner protector 106 are (1) to accommodate easy initiation of combustion once the burner protector 106, the jet nozzle 102 and the plate 104 have been removed from the heater as a unit, a match or the like being dropped through the open top of the burner protector into the region of the nozzle as the butane or the like is expressed from the nozzle, and (2) the burner protector also prevents extinguishment of the flame despite severe and prolonged winds.

Interposed between the sleeve 52 and the burner protector 106 is a retaining assembly or retaining bracket 112. The retaining bracket comprises a metal sleeve 114 cylindrical in shape and having an inside diameter of approximately the same dimension as the outside diameter of the burner protector so that when the burner protector 106 is placed within the sleeve 114 it will be there retained by friction. The retaining bracket 112 also includes a cup-shaped disc 116 which is apertured at 118 to accommodate free rise of the combusting air and butane into the combustion chamber 50. The outside diameter of the disc 116 is so sized as to be essentially the same as the inside diameter of the sleeve 52 so that the disc 116 is frictionally held within the sleeve 52 when there inserted. Three wires or rods 120 are welded at their upper end to the base of the disc 116 and at 122 to the sleeve 114 to form the integral retainer 112. These rods 120 are downwardly divergent, being bent at the weld 122, and each have a reverse bend or hook 124 at their lower extremity. The terminal end of each hook 124 is welded at 125 to a ring 127, which ring is so dimensioned as to have an inside diameter approximately the same as the outside diameter of the cylinder 52. The cylindrical sleeve 52 has a downwardly extending integral finger 130 provided with three apertures 132. The hooked arm 134 of the ring 127 surrounds the finger 130 in part and is also apertured at 136. The apertures 136 and any one of the apertures 134 may be aligned and bolt secured in a selected one of three positions. Thus, the distance from the nozzle 102 to the boiler 64 may be varied to regulate the heat transferred to the boiler while essentially maintaining the same heat transferred to the sleeper cab.

It should be observed that the burner protector 106 is removed with the nozzle 102 for initiating combustion and also functions to absolutely prevent extinguishment of the flame once combustion has been initiated, even when the protector 106 and the nozzle 102 are outside the heater. The burner or nozzle 102 is a blowtorch type nozzle, butane gas, in one presently preferred embodiment, being supplied at approximately 30 pounds pressure. The protector 106 and the nozzle 102, when removed from the remainder of the heater, may be used as a separate instrument, for example, to thaw out frozen parts of the truck, when and if necessary. The blowtorch type nozzle 102 is important in this heater because it readily facilitates generation of the tremendous quantities of heat necessary to properly elevate or maintain the engine and vehicle interior temperatures. A slow-burning flame would not be adequate to this end result during extremely cold weather.

In operation, the burner protector 106, the plate 104 and the jet nozzle 102 are removed as a unit from the heater 12, a lighted match is deposited or placed near the burner nozzle as butane or the like is initially caused to be issued from the nozzle. Thus, combustion is initiated. Thereafter, the burner, including the protector 106, the plate 104 and the nozzle 102, is replaced into the heater into position depicted in FIGURE 3, the retaining bracket 112 securing the inserted components in place and the sleeve 52 in turn retaining the retaining bracket 112 in place, all by frictional engagement. Combustion air is drawn through a set of apertures 108 at the base of the burner protector 106 transversely adjacent the nozzle 102 to provide combustion air and is also introduced through the apertures 110 immediately above the flame. The hot combusting air and gas are elevated by convectional currents through the aperture 118 in the disc 116 and into the combustion chamber 50. Heat resulting from combustion is thus transferred to the boiler 64 thereby elevating the temperature of the engine coolant contained therein. This increase in coolant temperature causes the coolant to self-circulate by reason of the rising action of the heated coolant resulting in circulation of cooler influent coolant through the hose 30 and the stub port 66 into the boiler and of heated effluent coolant from the boiler out the port 68, through the holes 32 and into the engine block. The products of combustion are continuously expelled to the atmosphere during combustion through the exhaust chimney 58 and the exhaust cap 62 by convectional currents.

Naturally, as the temperature of the intermediate sleeve 52, which forms the combustion chamber 50, increases, such heat is radiated from the sleeve 52 outwardly to heat the adjacent air contained within the air heating chamber 76, between the sleeves 52 and 74. Such hot air, by reason of density differential, rises in the chamber 76 by convection inducing a continuous natural air draft through the annular opening 78 to the chamber 76. The influent air is thus heated as it passes upwardly through the chamber 76. Subsequently, the heated air passes through the reducer 86 and the flexible hose 34 into the sleeper cab 28, all by convectional currents.

My actual test—a heater of the type depicted in the figures and previously described was used on a diesel tractor engine equipped with a 48 quart cooling system capacity. At —20° F., the heater preheated the diesel engine to a temperature of about 140° F. in one hour, the engine having remained inactive for a prolonged period of time, for example, over night. Also at —20° F. the heater of the present invention has successfully maintained the same diesel engine at 170° F. over night.

While the previous description and the illustrative drawings depict the boiler for heating the engine coolant as being disposed within the combustion chamber and the air heating chamber as being disposed exterior of the combustion chamber, it is to be appreciated that the relative locations of the engine coolant heating reservoir as the air heating chamber may be reversed or may be alternately disposed in segregated relation with respect to each other and in heat exchange relation with the combustion chamber 50.

Moreover, from the foregoing, it is to be appreciated that the present invention provides a novel method of and apparatus for jointly heating a vehicle engine and the interior of the vehicle. No danger of inhalation of carbon monoxide exhaust is presented. Electric and mechanically moving parts are not necessary. No time limit exists during which the system of the present invention may be utilized. Air flow is by natural draft induced by convectional currents. The construction is simplified and less expensive than generally comparable commercial products. The apparatus may be mounted external of the vehicle to simplify and reduce the cost of installation and maintenance. The flame is protected against extinguishment and the burner is selectively removeable from the heater for ease of initiating combustion and for use independent of the heater.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas heater adapted to be carried by an automotive vehicle to jointly (1) heat the vehicle engine to operating temperature while the engine is inactive and (2) warm the vehicle passenger interior: a burner including a pressure nozzle, hydrocarbon fuel being supplied to the nozzle from a reservoir, a generally cylindrical combustion chamber open at the bottom to accommodate (a) free draft ingress of air from combustion and (b) releasable placement of the burner within the combustion chamber, said combustion chamber communicating at the top with an exhaust chimney terminating in an exhaust cap inhibiting backdraft and entrance of precipitation, a burner protector partially enclosing said burner having both means to accommodate free draft ingress of air for combustion and means shielding the burner to prevent extinguishment of the flame by the wind, a retainer interposed between the burner protector and the interior of the combustion chamber to accommodate (a) ready removal of the burner protector and the burner from the combustion chamber to facilitate (1) ease of initiating of combustion and (2) use of the burner independent of the heater, and (b) secured retention of the burner protector within the combustion chamber when there-positioned, an engine coolant heating reservoir disposed within the combustion chamber and constituting part of a closed circulation system having reservoir inlet and outlet ports providing communication with the engine block, and a generally cylindrical outer shell circumscribing the exterior of the combustion chamber in spaced relation to form an air heating chamber therebetween segregated from said exhaust, said outer shell being open at the bottom to accommodate free draft ingress of air to be heated and communicating the heated air out the top of the outer shell via convectional currents through a conduit into the vehicle interior, said combustion chamber and said outer shell comprising concentric tubular shells extending vertically and spaced radially from each other to provide a straight-through passage for heated air to flow upwardly between said shells and also a straight-through passage for products of combustion to flow wholly upwardly within said combustion chamber from said open bottom thereof in a straight-line path upwards to said exhaust chimney, whereby said heater has no moving parts and relies wholly upon natural upward convection of air for circulation of air through the same.

2. In a gas heater adapted to be carried by an automotive vehicle to heat the engine of the vehicle and also warm the passenger space of the vehicle, the combination of a combustion chamber in the form of a tube adapted to be positioned vertically and having an open end at bottom thereof to allow free draft ingress of air for combustion, a chimney communicating with the top end of said combustion tube so that said combustion tube provides a straight-through passage for upward flow of air and combustion products from the bottom end of said tube to the top end thereof and out said chimney, a burner of the blow torch type positioned within said combustoion tube at the bottom end thereof and adapted to receive gas fuel under pressure from an external reservoir thereof to burn said fuel in said combustion chamber, an engine coolant heat exchanger supported within said combustion chamber above said burner and having inlet and outlet ports for providing communication with the engine to circulate engine coolant through said heat exchanger to transfer heat thereto from combustion products rising through said combustion tube in the operation of said heater, a tubular outer shell concentric with said combustion tube at the bottom end thereof and adapted to tubular outer shell being spaced radially from said combustion tube and having an open bottom end to provide an annular passage for air to flow along the exterior of said combustion tube in contact therewith in a straight-line path from said open bottom end of said tubular shell to the top end thereof so that such air is heated by heat transfer through the wall of said combustion tube, and conduit means communicating with the top end of said tubular outer shell for supplying heated air therefrom directly to the passenger space of a vehicle.

3. The gas heater of claim 2 further including a hollow cylindrical burner protector having a perforate wall surrounding and affixed to said burner, said burner protector serving to shield said burner from the wind but allowing flow of air to said burner from said open bottom end of said combustion tube to support combustion therein.

4. The gas heater of claim 3 including a retainer releasably holding said burner and said burner protector in said combustion tube allowing removal of the burner and burner protector from said combustion tube for lighting purposes or for use independently of said heater.

5. A gas heater adapted to be carried exteriorly of an automotive vehicle for heating the engine of the vehicle and for warming the passenger space of the vehicle, said heater including in combination a tubular outer shell adapted to be mounted on the vehicle with the axis thereof extending vertically and having an open end at the bottom thereof, a combustion tube mounted in concentric telescoped relation within said outer shell providing a straight-through annular passage between said tube and said shell for flow of air from the open bottom end of said shell to the top end thereof the air being heated by heat transfer through the wall of said combustion tube, said combustion tube having an open bottom end, conduit means communicating with the top end of said tubular shell adapted to direct such heated air to the passenger space of the vehicle, a burner of the blow torch type mounted in said combustion tube at the open bottom end thereof, said combustion tube providing another straight-through vertical passage for flow of air into said tube in communication with said burner and for flow of the products of combustion in a straight-line path upward through said tube to the top end thereof, a chimney communicating with the top end of said combustion tube for exhause of the products of combustion by natural draft, a burner protector in the form of a perforated tubular member extending about said burner for allowing flow of air to said burner but protecting said burner from the wind, and a heat exchanger supported within said combustion tube above said burner and having inlet and outlet ports for providing communication with the engine to circulate engine coolant through said heat exchanger to transfer heat thereto from combustion products rising in said tube in the operation of said heater.

References Cited by the Examiner
UNITED STATES PATENTS

| | | | |
|---|---|---|---|
| 1,814,744 | 7/1931 | Ellen | 237—12.31 |
| 2,211,831 | 8/1940 | Kuehn | 237—12.31 X |
| 2,616,412 | 11/1952 | Backus | 126—101 |
| 2,763,196 | 9/1956 | Singleton | 98—46 |

EDWARD J. MICHAEL, *Primary Examiner.*